(12) United States Patent
Sennoun

(10) Patent No.: US 11,018,807 B2
(45) Date of Patent: May 25, 2021

(54) METHOD FOR DETECTING A RESENDING OF A FRAME

(71) Applicant: SAGEMCOM ENERGY & TELECOM SAS, Rueil Malmaison (FR)

(72) Inventor: Yassir Sennoun, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 78 days.

(21) Appl. No.: 16/332,626

(22) PCT Filed: Sep. 8, 2017

(86) PCT No.: PCT/EP2017/072627
§ 371 (c)(1),
(2) Date: Mar. 12, 2019

(87) PCT Pub. No.: WO2018/046686
PCT Pub. Date: Mar. 15, 2018

(65) Prior Publication Data
US 2020/0127767 A1  Apr. 23, 2020

(30) Foreign Application Priority Data

Sep. 12, 2016  (FR) ...................................... 16/58453

(51) Int. Cl.
*H04L 1/08* (2006.01)
*H04L 12/06* (2006.01)
(Continued)

(52) U.S. Cl.
CPC ................ *H04L 1/08* (2013.01); *H04L 12/06* (2013.01); *H04L 12/08* (2013.01);
(Continued)

(58) Field of Classification Search
CPC .......... H04L 1/00; H04L 12/00; H04W 72/00; H04W 88/16
See application file for complete search history.

(56) References Cited

U.S. PATENT DOCUMENTS

| 7,971,253 B1 | 6/2011 | Gupta | |
| 2013/0094475 A1* | 4/2013 | Song | H04L 47/10 370/332 |

(Continued)

OTHER PUBLICATIONS

Jan. 3, 2018 International Search Report issued in International Patent Application No. PCT/EP2017/072627.

*Primary Examiner* — Andrew Lai
*Assistant Examiner* — Sumitra Ganguly
(74) *Attorney, Agent, or Firm* — Oliff PLC; R. Brian Drozd

(57) ABSTRACT

A method for detecting a resending of a frame, each frame sent that includes an identifier and a counter, the counter remaining identical during a resending, each frame sent being received by a plurality of gateways, each gateway retransmitting each frame to a central server, a response delay being predefined, the method comprising the steps of receiving a first frame comprising an identifier and a counter, storing as reference parameters a first reception time and the counter, receiving a second frame comprising the same identifier and another counter, and, if the values of the counters are equal then determining a second reception time of the second frame, and, if the difference between the reception times is greater than the response delay, then the second frame is a resending of the first frame, and updating the reference parameters with the second reception time.

9 Claims, 5 Drawing Sheets

(51) Int. Cl.
*H04L 12/08* (2006.01)
*H04L 12/46* (2006.01)
*H04L 12/66* (2006.01)
*H04W 72/04* (2009.01)
*H04W 88/16* (2009.01)

(52) U.S. Cl.
CPC .......... *H04L 12/4625* (2013.01); *H04L 12/66* (2013.01); *H04W 72/0453* (2013.01); *H04W 88/16* (2013.01)

(56) References Cited

U.S. PATENT DOCUMENTS

2014/0313996 A1* 10/2014 Suga ................ H04W 56/0045
370/329
2015/0188669 A1* 7/2015 Taniguchi ............ H04W 40/02
370/221

* cited by examiner

METHOD FOR DETECTING A RESENDING OF A FRAME

The present invention relates to the general field of telecommunications. The invention relates more particularly to the field of wireless communications for communicating objects ("machine to machine—M2M") and more specifically the field of communication networks known as "long range wide-area networks—LoRaWAN").

A long range wide-area network enables the connection of communicating objects and complies with constraints different from those of a conventional communication network such as a GSM (global system for mobile) network or a UMTS (universal mobile telecommunications system) network. In particular, this type of network frequently uses so-called "ISM" (industrial, scientific and medical) frequency bands. These frequency bands are therefore shared by a plurality of network operators and it is then necessary to reduce to a minimum the consumption of the radio resource available.

FIG. 1 illustrates a conventional architecture of a communication network enabling a connected object 101 to communicate with a central server 110. The following description emphasises the LoRa™ standard (the standard published by the LoRa Alliance) but other communication technologies are possible. The object connected to the terminal 101 is typically an electronic device comprising a radio transmitter. The radio transmitter is adapted for transmitting and receiving frames or messages via a carrier frequency among a plurality of carrier frequencies included in a predetermined frequency band, for example an ISM frequency band. When the radio transmitter sends a frame, the latter may be received by one or more radio receivers or gateways 120, 12$i$, ..., 12N (N being greater than 0 and i being between 0 and N). The connected object 101 being potentially mobile, unlike the gateways 120, 12$i$, ..., 12N, which are placed at fixed points, a frame sent by a connected object 101 may be received by one or more gateways 120, 12$i$, ..., 12N. Each gateway 120, 12$i$, ..., 12N is connected, possibly via a different network and technology, to a central server 110 known as an LNS server (LoRa network server). Each gateway 120, 12$i$, ..., 12N receiving a frame coming from the connected object 101 next transmits this frame to the central server 110. If a frame sent by the connected object 101 is received by "m" gateways 120, 12$i$, ..., 12N, then the central server receives "m" examples or copies of this same frame retransmitted by said "m" gateways (unless there is a communication problem between a gateway and central server 110 causing a loss of frame). It should be noted that each gateway 120, 12$i$, ..., 12N is connected to the central server 110 by a communication network that may be different. Thus, as illustrated in FIG. 1, the gateway 120, 12$i$, ..., 12N is connected to the central server 110 via the network 131 and the network 130, possibly with a different technology. Each communication network, for example the communication networks 130 or 131, enabling the connection of a gateway 120, 12$i$, ..., 12N to the central server 110 may therefore cause a different delay in transmission of the frames (or latency), a transmission delay that may be related to the technology used by the communication network, but also possibly to congestion of said communication network. The transmission delay is typically around ten or a hundred milliseconds, but may be as much as several seconds in some cases.

When the central server 110 receives a frame coming from the connected object 101, the LoRa™ standard defines a response delay (hereinafter "RXDelay") so that the central server 110 can respond, by sending a frame, to the connected object 101. This is because, in order to reduce the power consumption, the connected object 101 can, following the sending of a frame, go into standby, and start to listen for any response only after the expiry of the response delay, and this for a given time. Possibly, the standard may even define a plurality of possible response delays (for example "RX1 Delay" and "RX2 Delay" for the LoRa™ standard), the connected object listening out for a possible response at the expiry of each delay for a given time. The length of the response delay or delays is parameterised by an operator of the communication network. Typically, a length of a response delay is around one or several seconds.

Each frame sent comprises a counter ("frame counter", hereinafter "FcntUp"), the counter being incremented at each sending of a new frame by the connected object 101. In the absence of a response to a frame previously sent, the connected object 101 can resend said frame. According to the LoRa™ standard, the value of the counter "FcntUp" for the resent frame is identical to that of the previously sent frame. In other words, a frame and a corresponding resent frame have the same value of the counter "FcntUp".

When the connected object 101 is connected to more than just one gateway 120, 12$i$, ..., 12N, the central server 110 may therefore potentially receive a plurality of frames, retransmitted by a plurality of gateways 120 etc., these frames all comprising a counter with the same value: each frame may correspond either to an example of the frame sent by the connected object 101 that passed through a different gateway 120, 12$i$, ..., 12N or to a possible resending of the frame. It should be noted that a resent frame may itself be received in a plurality of examples by the central server 110 if it passes via a plurality of gateways 120, 12$i$, ..., 12N.

It is desirable to avoid responding to all the frames received in order to avoid unnecessary consumption of the radio resource. In addition to the consumption of the radio resource that would be required by the sending of a frame to the connected object 101 by one of the gateways 120, 12$i$, ..., 12N, it should be noted that the LoRa™ standard defines a mechanism for limiting the consumption of the radio resource known as "Duty Cycle" for each gateway 120, 12$i$, ..., 12N, the purpose of said mechanism being that a gateway 120, 12$i$, ..., 12N would not be able to send for more than a certain proportion of time on certain frequencies. It is thus all the more desirable to limit the sending of frames to the connected object 101 in order to limit the use of gateways transmitting to a connected object.

To this end, it is necessary to propose a method enabling a central server 101 to distinguish, for two frames comprising the same "FcntUp" counter value sent by the same connected object 101, between a resending of the frame and a reception of another example of the frame via another gateway. One response is probably to send in the first case whereas in the second case the frame can probably be ignored, which preserves the radio resource.

The invention relates to a method for detecting a resending by an electronic device of a frame previously sent by the electronic device, the electronic device sending each frame on one carrier frequency among a predetermined plurality of carrier frequencies, each frame sent comprising an identifier associated with the electronic device and a counter, the value of the counter remaining identical when a frame is resent and being incremented at the time of sending of a new frame, each frame sent being received by a plurality of radio receivers, known as gateways, each gateway being connected to the same central server and retransmitting each frame received to the central server, a response delay being predefined for sending in return a frame to the electronic device. The method is executed by the central server and comprises the steps of receiving a first frame comprising a first identifier and a first counter, determining a first time for receiving the first frame, storing the first reception time and the value of the first counter as reference parameters associated with a first identifier, receiving a second frame comprising a second identifier and a second counter, if the second identifier is equal to the first identifier and if the value of the second counter is equal to the value of the first counter, then determining a second time for receiving the second frame and, if the difference between the second reception time and the first reception time is greater than the predefined response delay, then the second frame is considered to be a resending of the first frame, and updating the reference parameters associated with a first identifier by replacing the first reception time by the second reception time.

According to a complementary embodiment of the invention, the second gateway being synchronised timewise with the central server, if the second frame is considered to be a resending of the first frame and the second reception time is less than the first reception time, then the first frame is considered to be a resending of the second frame and the step of updating the reference parameters associated with the first identifier is not executed.

According to a complementary embodiment of the invention, the second gateway not being synchronised timewise with the central server, the first frame being sent on a first carrier frequency, the first carrier frequency being stored as a reference parameter associated with the first identifier, the second frame being sent on a second carrier frequency, if the difference between the second reception time and the first reception time is not greater than the predefined response delay and the second carrier frequency is different from the first carrier frequency, then the second frame is considered to be a resending of the first frame, and the method comprises the step of updating the reference parameters associated with the first identifier by replacing the first reception time by the second reception time and the first carrier frequency by the second carrier frequency.

According to a complementary embodiment of the invention, if the value of the second counter is greater than the value of the first counter, then the method comprises a step of updating the reference parameters associated with the first identifier by replacing the first reception time by the second reception time, the first carrier frequency by the second carrier frequency and the value of the first counter by the value of the second counter.

The invention also relates to a central server of a communication network comprising at least one electronic device sending a frame on a carrier frequency among a predetermined plurality of carrier frequencies, each frame sent comprising an identifier associated with the electronic device and a counter, the value of the counter remaining identical when a frame is resent and being incremented when a new frame is sent, each frame sent being received by a plurality of radio receivers, referred to as gateways, each gateway being connected to the central server and retransmitting each frame received to the central server, a response delay being predefined for sending in return a frame to the electronic device, the central server being adapted for receiving a first frame comprising a first identifier and a first counter, determining a first time for receiving the first frame, storing the first reception time and the value of the first counter as reference parameters associated with the first identifier, receiving a second frame comprising a second identifier and a second counter, if the second identifier is equal to the first identifier and if the value of the second counter is equal to the value of the first counter, then determining a second time for receiving the second frame, and, if the difference between the second reception time and the first reception time is greater than the predefined response delay, then the second frame is considered to be a resending of the first frame, and updating the reference parameters associated with the first identifier by replacing the first reception time by the second reception time.

According to a complementary embodiment, the second gateway being synchronised timewise with the central server, if the second frame is considered to be a resending of the first frame and the second reception time is less than the first reception time, then the first frame is considered to be a resending of the second frame and the central server is adapted for not updating the reference parameters associated with the first identifier.

According to a complementary embodiment, the second gateway not being synchronised timewise with the central server, the first frame being sent on a first carrier frequency, the central server being adapted for storing the first carrier frequency as a reference parameter associated with the first identifier, the second frame being sent on a second carrier frequency, if the difference between the second reception time and the first reception time is not greater than the predefined response delay and the second carrier frequency is different from the first carrier frequency, then the second frame is considered to be a resending of the first frame, and the central server is adapted for updating the reference parameters associated with the first identifier by replacing the first reception time by the second reception time and the first carrier frequency by the second carrier frequency.

According to a complementary embodiment, if the value of the second counter is greater than the value of the first counter, then the central server is adapted for updating the reference parameters associated with the first identifier by replacing the first reception time by the second reception time, the first carrier frequency by the second carrier frequency and the value of the first counter by the value of the second counter.

The invention also relates to a computer program that can be stored on a medium and/or downloaded from a communication network in order to be read by a processor. This computer program comprises instructions for implementing all or some of the steps mentioned below when said program is executed by the processor.

The invention also relates to an information storage medium comprising such a computer program.

The features of the invention mentioned above, as well as others, will emerge more clearly from a reading of the following description of an example embodiment, said description being given in relation to the accompanying drawings, among which:

Figure 1:
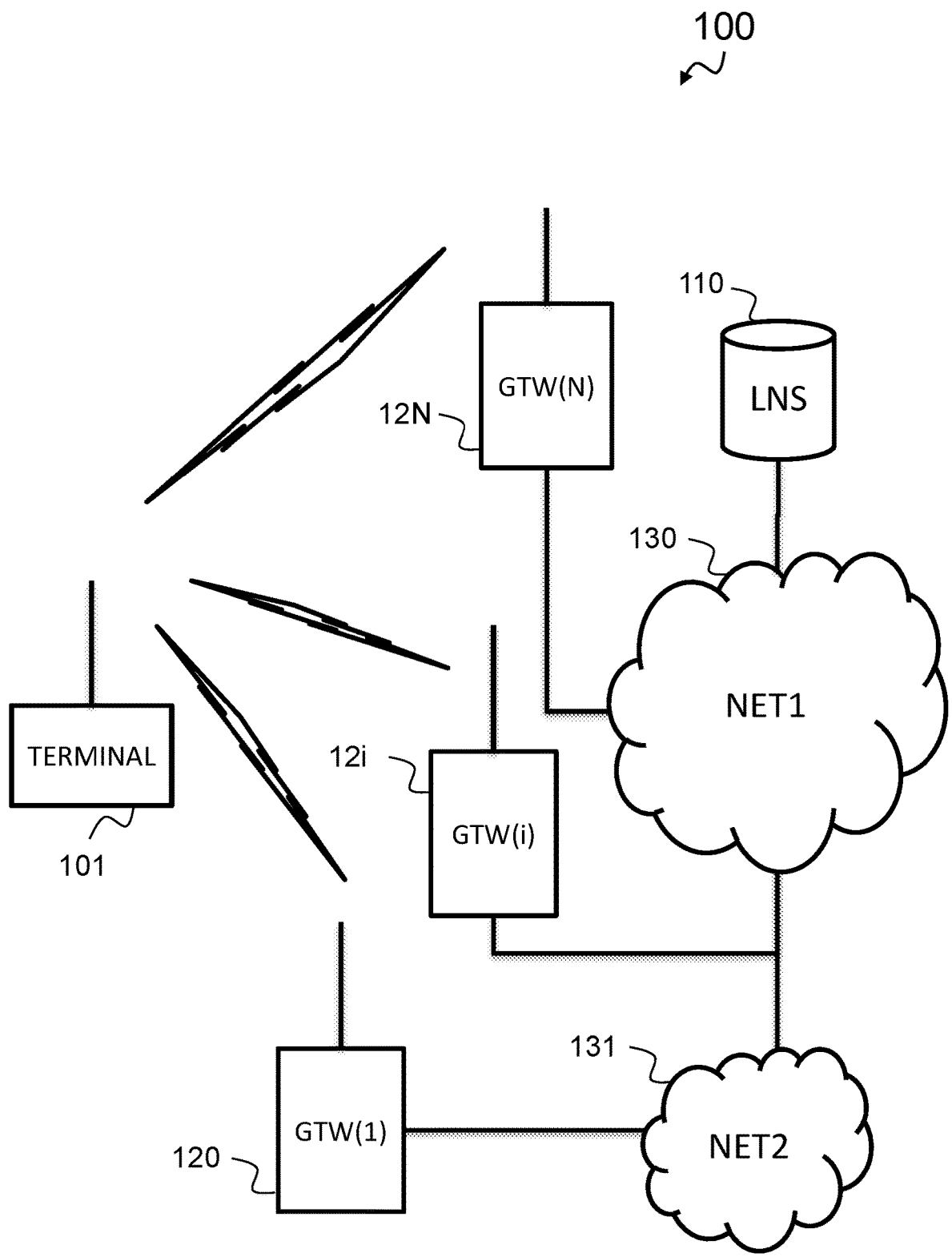
FIG. 1 illustrates schematically a conventional architecture of a communication network known as a "long range wide-area network", typically conforming to a LoRa™ standard.
Figure 2:
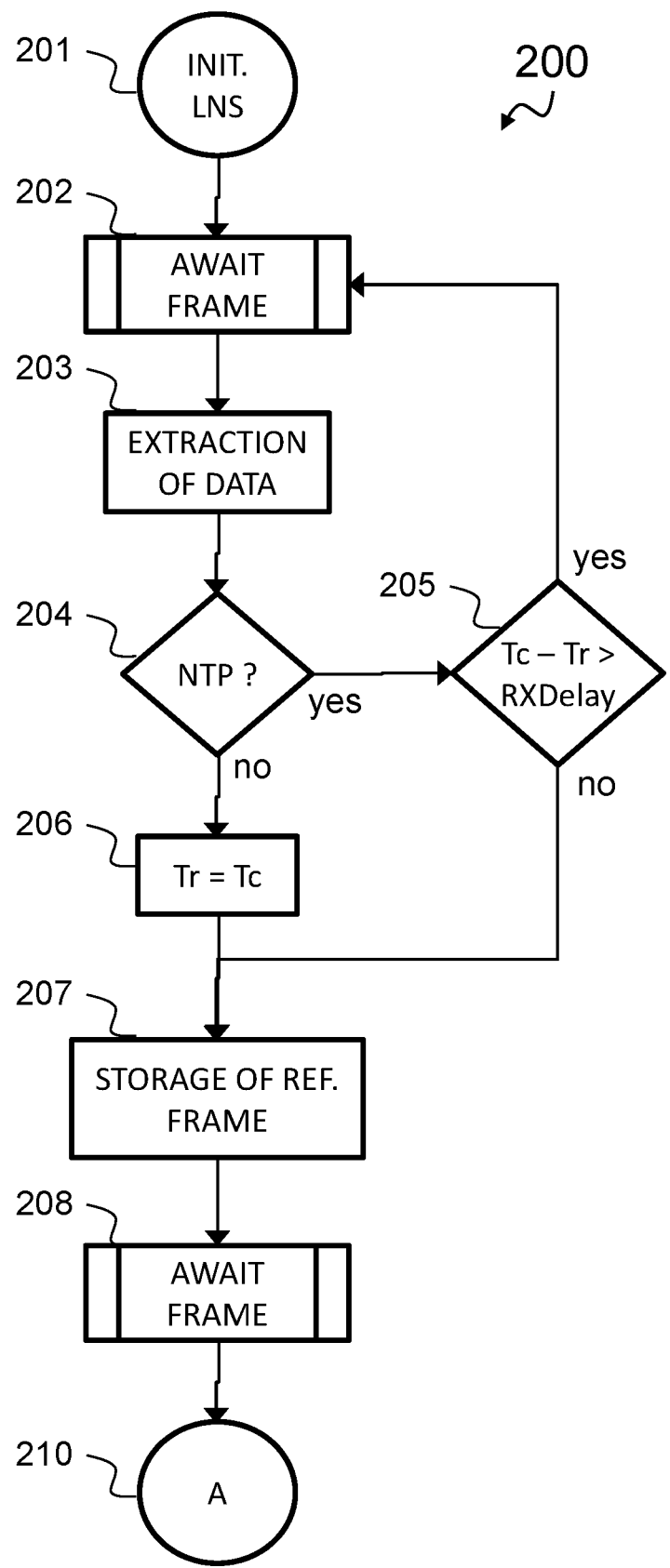
FIGS. 2, 3 and 4 illustrate schematically a method for detecting a resending by a radio transmitter of a frame previously sent by the radio transmitter, according to one embodiment of the invention.
Figure 3:
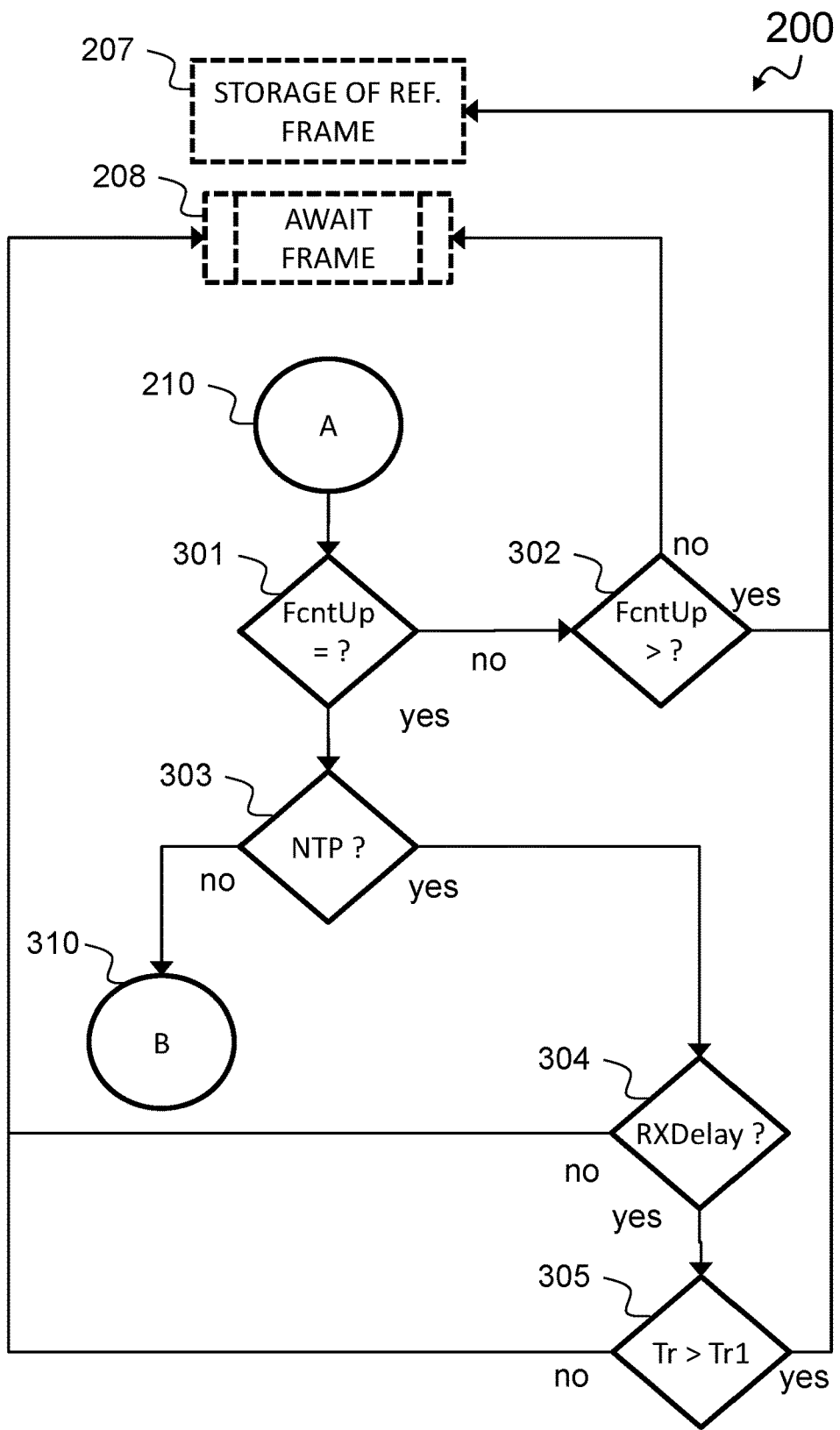
Figure 4:
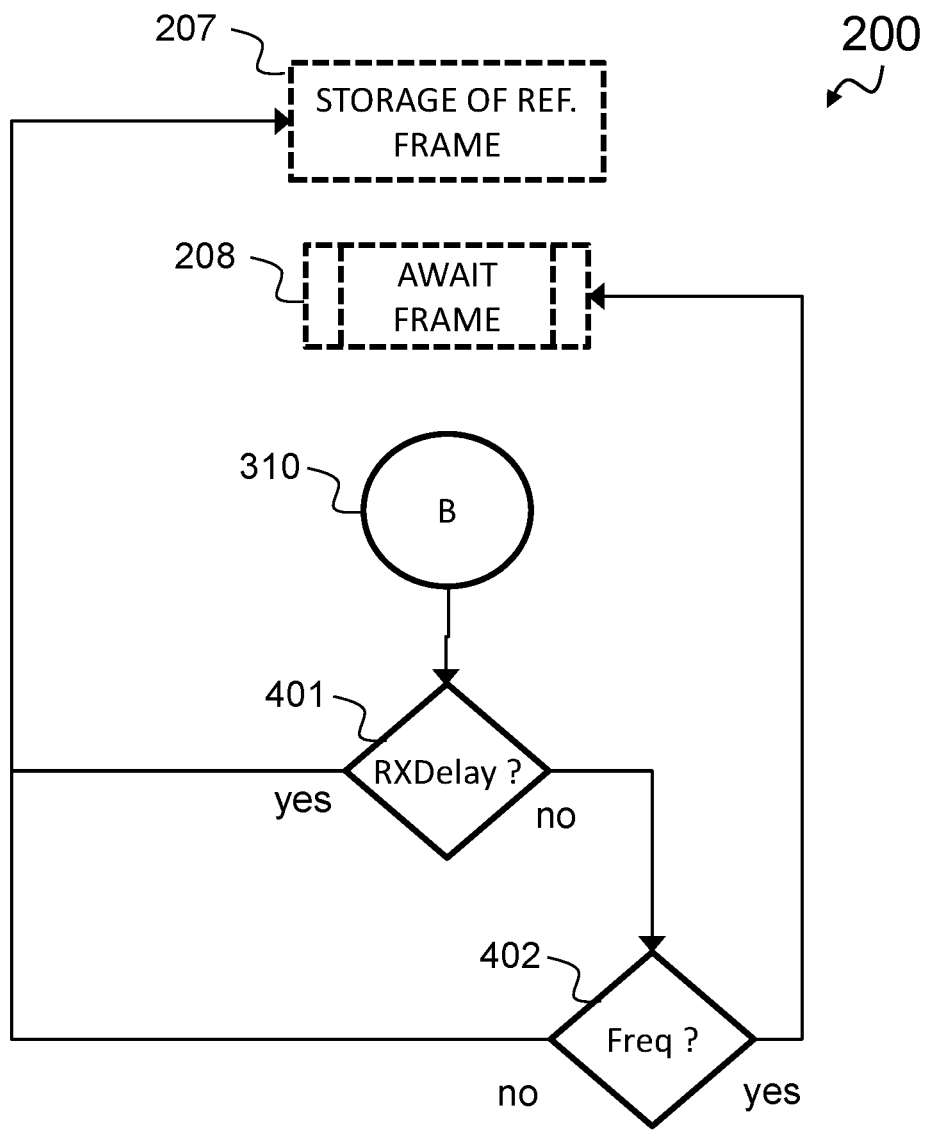

FIGS. 2, 3 and 4 illustrate schematically a method 200 for detecting a resending by a radio transmitter included in the electronic device 101 of a frame previously sent by the radio transmitter, in accordance with one embodiment of the invention, the method 200 being executed by the central server 110.

Step 201 corresponds to the initialisation of the central server 110, followed for example by the powering up thereof. During this step 201, as described below in FIG. 5, the central server 110 is adapted for loading in a memory the instructions for executing the method 200. During step 201, connections can be established with the gateways 120, 12i, ..., 12N. The central server 110 may comprise a time synchronisation function enabling gateways among the gateways 120, 12i, ..., 12N to synchronise themselves timewise. The central server 110 may comprise a time synchronisation relay function. Typically, the central server 110 is an NTP (Network Time Protocol) relay enabling the gateways 120, 12i, ..., 12N connected to the central server 110 to benefit from a time synchronisation with the central server 110. The central server 110 may itself synchronise with an NTP server (not shown). According to a complementary embodiment, the gateways 120, 12i, ..., 12N synchronise themselves timewise with an NTP server, possibly the same as the one used by the central server 110 to synchronise itself. According to a complementary embodiment, the gateways 120, 12i, ..., 12N and/or the central server 110 synchronise themselves timewise via a technology of the GPS (Global Positioning System) or Glonass type.

In a following step 202, the central server 110 waits until it receives a first frame. Said frame corresponds to a frame sent by an electronic device such as the electronic device or terminal 101. The electronic device 101 sends a frame on a carrier frequency among a predetermined plurality of carrier frequencies, the frame sent comprising an identifier associated with the electronic device 101 and a "FcntUp" counter, the value of the "FcntUp" counter remaining identical when a frame is resent and being incremented when a new frame is sent. Said frame is received by at least one gateway 120, 12i, ..., 12N and retransmitted by at least the gateway 120, 12i, ..., 12N to the central server 110. Step 202 corresponds to the reception of a first frame following the powering up of the central server 110. When a frame is retransmitted to the central server 110, each gateway 120, 12i, ..., 12N adds information for identifying said gateway, information on the frame reception time "Tr" and information on the carrier frequency on which the frame is received. Possibly, each gateway 120, 12i, ..., 12N also adds information for knowing whether said gateway is synchronised timewise. Thus the information may indicate if each gateway 120, 12i, ..., 12N is synchronised timewise on an NTP server, for example if the central server 110 offers an NTP server function, or for example if a gateway 120, 12i, ..., 12N comprises a GPS receiver.

The time for reception "Tr" of the frame by a gateway 120, 12i, ..., 12N corresponds to a timestamping of the moment of receipt of the frame by the gateway 120, 12i, ..., 12N. This reception time "Tr" is retransmitted by each gateway 120, 12i, ..., 12N with each retransmitted frame.

In a following step 203, the central server 110 extracts the data included in the frame received during the previous step 202. The data correspond at least to the identifier associated with the electronic device 101, to the value of the "FcntUp" counter, to information for identifying the gateway 120, 12i, ..., 12N that retransmitted the frame and to the information on the carrier frequency on which the frame was received by the gateway 120, 12i, ..., 12N. The central server 110 can extract information retransmitted by the gateway 120, 12i, ..., 12N indicating whether said gateway 120, 12i, ..., 12N is synchronised timewise with the central server 110. Alternatively, the central server 110, if it serves as an NTP server, can determine whether a gateway 120, 12i, ..., 12N is synchronising with said NTP server.

In a following step 204, the central server 110 determines whether the gateway 120, 12i, ..., 12N that retransmitted the first frame received during step 202 is synchronised timewise, for example via an NTP server.

If such is the case, in a step 205, the central server 110 determines the current time and the time that has elapsed between the current time "Tc" and the reception time "Tr" indicated by the gateway 120, 12i, ..., 12N. In other words, during step 205, the central server 110 determines the time that has elapsed since the reception time "Tr". If this time is greater than the response delay "RXDelay", then it is too late to respond to the frame received, the frame is ignored and the central server 110 returns to step 202 awaiting a new frame. If this time is less than the response delay "RXDelay", then the central server 110 passes to step 207.

If such is not the case, that is to say the gateway 120, 12i, ..., 12N that retransmitted the frame received is not synchronised timewise, then the central server 110 considers that the reception time "Tr" indicated by the gateway is not reliable. The reception time "Tr" is then updated and replaced by the current time "Tc", that is to say the time of reception of the frame by the central server 110, rather than the one indicated by the gateway 120, 12i, ..., 12N. The central server 110 next passes to step 207.

In step 207, the central server 110 records the data extracted during step 203 as being reference parameters associated with an identifier of an electronic device for the remainder of the method 200. If the reception time "Tr" was updated during step 206, the new reception time "Tr" (that is to say the current time "Tc" of the central server 110 when the frame was received) is recorded. In other words, the central server 110 considers as reference parameters associated with the identifier of the electronic device 110 the reception time "Tr", the frequency of the carrier and the value of the "FcntUp" counter, these parameters being recorded or stored by the central server 110 in a memory or a storage module, as described in FIG. 5. The reception time "Tr" recorded as the reference parameter during this step 207 is referred to as the reference reception time, hereinafter "Tref".

In a following step 208, the central server 110 awaits a new frame.

If a new frame is received by the central server 110, the central server 110 determines the identifier of the electronic device that sent the frame. If the identifier is equal to an identifier of an electronic device registered, the central server 110 determines that this new frame was sent by the same electronic device and finds the reference parameters associated with the identifier. Next, the central server 110 passes to step 301 (FIG. 3).

If the new frame received comprises an identifier not previously recorded in association with reference parameters, then the central server 110 passes to step 203.

Thus step 301 is executed by the central server 110 following reception of a second frame, sent for example by the electronic device 101, whereas reference parameters associated with the identifier of the same electronic device 101 and issuing from the same frame were previously recorded during a step 207.

During step 301, the central server 110 determines the value of the "FcntUp" counter of the second frame received.

If the value of the "FcntUp" counter of the second frame received is equal to the value of the "FcntUp" counter recorded as a reference parameter in association with the identifier of the electronic device 101, then the central server 110 must determine whether the second frame is a resending of the first frame or not. The central server 110 then passes to step 303.

Otherwise the central server 110 passes to step 302.

During step 302, if the value of the "FcntUp" counter of the second frame received is lower than the value of the "FcntUp" counter recorded as a reference parameter in association with the identifier of the electronic device 101, then the second frame is ignored and the central server 110 goes to step 208 again. If the value of the "FcntUp" counter of the second frame received is higher than the value of the "FcntUp" counter recorded as a reference parameter in association with the identifier of the electronic device 101, then the central server 110 goes to step 207 again. During this new step 207, the central step 110 updates the reference parameters associated with the identifier of the electronic device 101 with the data extracted from the second frame. In other words, the central server 110 extracts the data from the value of the "FcntUp" counter of the second frame, the carrier frequency used for the sending of the second frame and the reception time "Tr" of the second frame for updating the reference parameters associated with the identifier of the electronic device 101. Concerning the reception time "Tr" of the second frame, this is directly stored if the gateway that retransmitted the second frame is synchronised timewise. Otherwise the current time "Tc" of the central server 110 is stored instead as reference parameters associated with the identifier of the electronic device 101. In other words, the reference reception time "Tref" is updated with the reception time "Tr" if the gateway that retransmitted the second frame is synchronised timewise, or with the current time "Tc" otherwise.

In step 303, the central server 110 determines whether the gateway that retransmitted the second frame is synchronised timewise.

If such is the case, the central server 110 passes to step 304.

If such is not the case, the central server 110 passes to step 401 (FIG. 4).

In step 304, the central server 110 determines the time that has elapsed between the reception time "Tr" of the second frame and the reference reception time "Tref".

If the time elapsed, in absolute value, is less than the response delay "RXDelay", then the central server 110 determines that the second frame received is an example (in other words a copy) of the first frame received by another gateway. The second frame can thus be ignored, and the central server 110 next goes to step 208 again, awaiting a new frame.

If the time elapsed, in absolute value, is greater than the response delay "RXDelay", then the central server 110 passes to step 305.

In step 305, the central server 110 compares the reception time "Tr" of the second frame and the reference reception time "Tref".

If the reception time "Tr" of the second frame is less than the reference reception time "Tref", then the central server 110 determines that the first frame, the data of which are stored as reference parameters, is a resending of the second frame. The second frame can be ignored by the central server 110 and the central server 110 goes to step 208 again, awaiting a new frame.

If the reception time "Tr" of the second frame is greater than the reference reception time "Tref", then the central server 110 determines that the second frame is a resending of the first frame, the data of which are stored as reference parameters. The central server 110 then goes to step 207 again. During this new step 207, the central server 110 updates the reference parameters associated with the identifier of the electronic device 101 with the data extracted from the second frame. In other words, the central server 110 extracts the data of the value of the "FcntUp" counter of the second frame, the carrier frequency used for sending the second frame and the reception time "Tr" of the second frame for updating the reference parameters associated with the identifier of the electronic device 101. Concerning the reception time "Tr" of the second frame, this is directly stored if the gateway that retransmitted the second frame is synchronised timewise. Otherwise the current time "Tc" of the central server 110 is stored instead as reference parameters associated with the identifier of the electronic device 101. In other words, the reference reception time "Tref" is updated with the reception time "Tr" of the second frame if the gateway that retransmitted the second frame is synchronised timewise, or with the current time "Tc" otherwise.

In step 401, the central server 110 determines the time elapsed between the current time "Tc" of the central server 110 and the reference reception time "Tref". This step is similar to step 304, with the difference that the central server 110 uses the current time "Tc" rather than the reception time "Tr" of the second frame, the latter time being supplied by a gateway that is not synchronised timewise.

If this elapsed time is greater than the response delay "RXDelay", then the central server 110 determines that the second frame is a resending of the first frame. The central server 110 goes to step 207 again and updates the reference parameters by updating the values of the reference reception times "Tref", this reference reception time "Tref" taking the value of the current time "Tc". The central server 110 also updates the carrier frequency used by the second frame for sending thereof.

If the time elapsed is less than the response delay "RXDelay", the central server 110 passes to step 402.

In step 402, the central server 110 determines whether the second frame has been sent on the same carrier frequency as the first frame. This is because the LoRa™ standard requires that a new carrier frequency be chosen, at random, among the plurality of possible carrier frequencies, for resending a frame. On the other hand, if two frames received are two examples of the same frame sent, the carrier frequency is by definition the same. Thus, if the first and second frames are received via two different carrier frequencies, it cannot be a question of two examples of the same frame. Consequently, if the central server 110 determines that the carrier frequencies are different, the central server 110 determines that the second frame is a resending of the first frame. The central server 110 goes to step 207 again and updates the reference parameters with the data associated with the second frame. In particular, the reference reception time "Tref" is updated with the value of the current time "Tc".

On the other hand, if the central server 110 determines that the first frame and the second frame were sent on the same carrier frequency, the central server 110 then determines that the second frame is an example of the first frame received via a different gateway. This is because, in this precise case, the second frame could be a resending of the first frame, a resending being able to be made on the same carrier frequency since this is chosen at random. However, the probability is greater that, at the time of resending, a different frequency is used, and consequently the central server 110 determines that the second frame is more probably an example of the first frame received via a different gateway. The central server 110 ignores the second frame and next passes to step 208 again.

Figure 5:
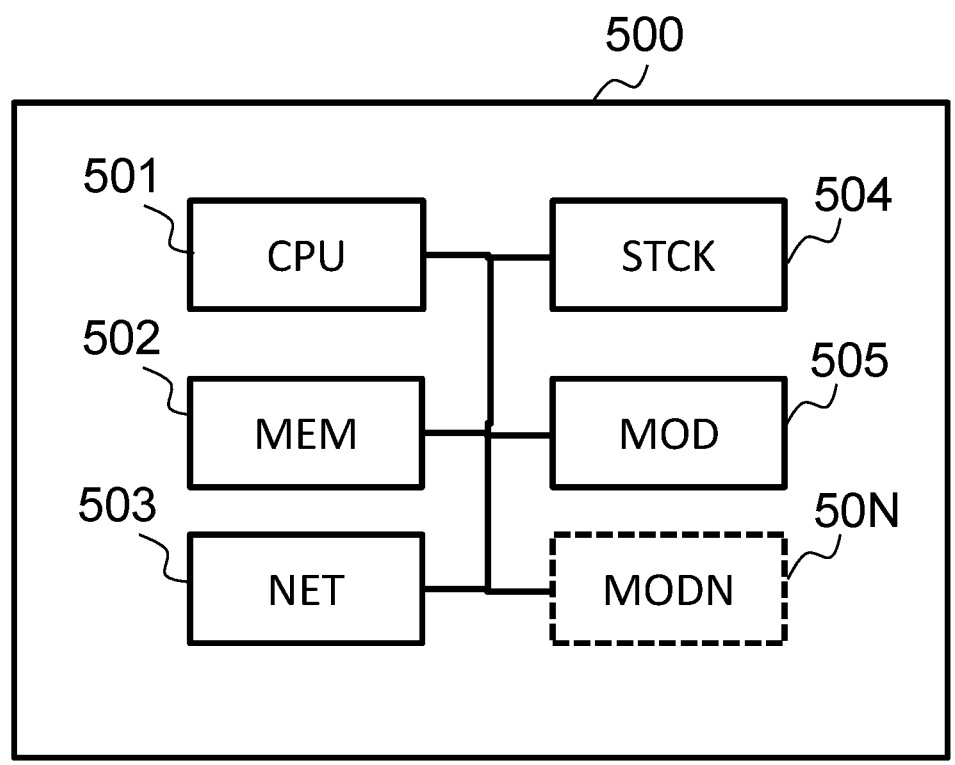
FIG. 5 illustrates schematically the hardware architecture of a server adapted for implementing a method for detecting a resending by a radio transmitter of a frame previously sent by the radio transmitter, in accordance with one embodiment of the invention.

FIG. 5 illustrates schematically the hardware architecture of a server 500, for example for the central server 110, adapted for implementing the method enabling detection of a resending by a radio transmitter of a frame previously sent by the radio transmitter described in FIGS. 2, 3 and 4. The server 500 comprises, connected by a communication bus: a processor or CPU (central processing unit) 501, a memory MEM 502 of the RAM (random access memory) type and/or ROM (read only memory) type, a network module NET 503, a storage module STCK 504 of the internal storage type, and possibly other modules 505 to 50N of various natures. The storage module STCK 504 may be of the hard disk HDD (hard disk drive) or SSD (solid-state drive) type, or of the external storage medium reader type, such as an SD (secure digital) card reader. The processor CPU 501 can record data on the storage module STCK 504 or read data recorded on the storage module STCK 504. These data may correspond to configuration parameters of the server 500 or to information received for example in a message received by the network module NET 503, or via another communication module 50N. The network module NET 503 enables connection of the server 500 to one or more communication networks. The network module 503 typically enables connection of the server 500 to the interne. The network module 503 enables the server 500 to send and respectively to receive frames intended for and respectively coming from one or more connected objects, for example the connected object 101, the frames passing via one of the gateways 120, 12*i*, ... , 12N.

The processor CPU 501 is capable of executing instructions loaded in the memory MEM 502, for example from the storage module STCK 504 or from a communication network via the network module NET 503, or from another communication module 50N for example. When the server 500 is powered up, the processor CPU 501 is capable of reading instructions from the memory MEM 502 and executing them. These instructions form a computer program causing the implementation, by the processor CPU 501, of all or some of the methods and steps described above. Thus all or some of the methods and steps described above can be implemented in software form by the execution of a set of instructions by a programmable machine, such as a DSP (digital signal processor) or a microcontroller. All or some of the methods and steps described here may also be implemented in hardware form by a machine or a dedicated component, such as an FPGA (field-programmable gate array) or an ASIC (application-specific integrated circuit). The server 500 is typically a so-called LNS (LoRa network server), that is to say a server used in a communication network in accordance with the LoRa™ standard.

The server 500 is adapted for implementing all or some of the steps of the method 200 described in FIGS. 2, 3 and 4 enabling detection of a resending by a radio transmitter of a frame previously sent by the radio transmitter.

The invention claimed is:

1. A method for detecting a resending by an electronic device of a frame previously sent by the electronic device, the electronic device sending each frame on one carrier frequency among a predetermined plurality of carrier frequencies, each frame sent comprising an identifier associated with the electronic device and a counter, the value of the counter remaining identical when a frame is resent and being incremented at the time of sending of a new frame, each frame sent being received by a plurality of radio receivers, known as gateways, each gateway being connected to the same central server and retransmitting each frame received to the central server, a response delay being predefined for sending in return a frame to the electronic device, the method being executed by the central server wherein said method causes the central server to perform:

receiving a first frame comprising a first identifier and a first counter, determining a first reception time for receiving the first frame, storing the first reception time and the value of the first counter as reference parameters associated with the first identifier, receiving a second frame comprising a second identifier and a second counter, if the second identifier is equal to the first identifier and if the value of the second counter is equal to the value of the first counter, then:

determining a second reception time for receiving the second frame and, if the time elapsed between the second reception time and the first reception time is greater than the predefined response delay, then the second frame is considered to be a resending of the first frame, and updating the reference parameters associated with the first identifier by replacing the first reception time by the second reception time.

2. The method according to claim 1, wherein the gateway that retransmitted the second frame being synchronised timewise with the central server, if furthermore the second reception time is less than the first reception time, then the first frame is considered to be a resending of the second frame and the step of updating the reference parameters associated with the first identifier is not executed.

3. The method according to claim 1, wherein, the gateway that retransmitted the second frame not being synchronised timewise with the central server, the first frame being sent on a first carrier frequency, the first carrier frequency being stored as reference parameters associated with the first identifier, the second frame being sent on a second carrier frequency, if the difference between the second reception time and the first reception time is not greater than the predefined response delay and the second carrier frequency is different from the first carrier frequency, then the second frame is considered to be a resending of the first frame, and the method causing the central server to perform:

updating the reference parameters associated with the first identifier by replacing the first reception time by the second reception time and the first carrier frequency by the second carrier frequency.

4. The method according to claim 3, wherein if the value of the second counter is greater than the value of the first counter, then the method causing the central server to perform:

updating the reference parameters associated with the first identifier by replacing the first reception time by the second reception time, the first carrier frequency by the second carrier frequency and the value of the first counter by the value of the second counter.

5. A non transitory recording medium storing instructions for causing implementation, by a processor, of the method according to claim 1, when the instructions are read from the non-transitory recording medium and executed by the processor.

6. A central server of a communication network comprising at least one electronic device sending a frame on a carrier frequency among a predetermined plurality of carrier frequencies, each frame sent comprising an identifier associated with the electronic device and a counter, the value of the counter remaining identical when a frame is resent and being incremented when a new frame is sent, each frame sent being received by a plurality of radio receivers, referred to as gateways, each gateway being connected to the central server and retransmitting each frame received to the central server, a response delay being predefined for sending in return a frame to the electronic device, the central server comprising:

a processor being adapted for:
receiving a first frame comprising a first identifier and a first counter,
determining a first reception time for receiving the first frame,
storing the first reception time and the value of the first counter as reference parameters associated with the first identifier,
receiving a second frame comprising a second identifier and a second counter,
if the second identifier is equal to the first identifier and
if the value of the second counter is equal to the value of the first counter, then:
determining a second reception time for receiving the second frame and
if the time elapsed between the second reception time and the first reception time is greater than the predefined response delay, then the second frame is considered to be a resending of the first frame, and
updating the reference parameters associated with the first identifier by replacing the first reception time by the second reception time.

7. The central server according to claim 6, the second gateway that retransmitted the second frame being synchronised timewise with the central server, wherein the central server, if furthermore the second reception time is less than the first reception time, considers the first frame to be a resending of the second frame and the central server is adapted for not updating the reference parameters associated with the first identifier.

8. The central server according to claim 6, the gateway that retransmitted the second frame not being synchronised timewise with the central server, the first frame being sent on a first carrier frequency, the central server being adapted for storing the first carrier frequency as reference parameters associated with the first identifier, the second frame being sent on a second carrier frequency, wherein the central server, if the time elapsed between the second reception time and the first reception time is not greater than the predefined response delay and the second carrier frequency is different from the first carrier frequency, considers the second frame to be a resending of the first frame, and the central server is adapted for:
updating the reference parameters associated with the first identifier by replacing the first reception time by the second reception time and the first carrier frequency by the second carrier frequency.

9. The central server according to claim 8, wherein the central server, if the value of the second counter is greater than the value of the first counter:
updates the reference parameters associated with the first identifier by replacing the first reception time by the second reception time, the first carrier frequency by the second carrier frequency and the value of the first counter by the value of the second counter.

* * * * *